May 19, 1931.  V. GENKIN  1,806,392

POLYPHASE ELECTRICAL INSTRUMENT

Filed Aug. 14, 1926   2 Sheets-Sheet 1

Positive Sequence.   Negative Sequence.

WITNESSES:

INVENTOR
Vladimir Genkin.
BY
Wesley G Carr
ATTORNEY

May 19, 1931.  V. GENKIN  1,806,392
POLYPHASE ELECTRICAL INSTRUMENT
Filed Aug. 14, 1926  2 Sheets-Sheet 2

Balanced Three Phase Fault

Vectors

Wire To Wire Fault-Wires a & b

Vectors

Element 4

Considerable Torque

Element 4

Element 5

Zero Torque

Element 5

Torque equal to that of Fig. 7.

A, B, C Vectors Are Current Vectors
X, Y, Z Vectors Are Flux Vectors.

INVENTOR
Vladimir Genkin
BY
Wesley G. Carr
ATTORNEY

Patented May 19, 1931

1,806,392

UNITED STATES PATENT OFFICE

VLADIMIR GENKIN, OF MARSEILLE, FRANCE

POLYPHASE ELECTRICAL INSTRUMENT

Application filed August 14, 1926. Serial No. 129,251.

My invention relates to polyphase electrical instruments and particularly to instruments responsive to a condition of electrical unbalance in a polyphase circuit.

An object of my invention is to improve and simplify the construction of electrical instruments operating upon the phase-sequence principle.

A further object of my invention is to provide in connection with a polyphase electrical circuit, a stationary net-work comprising not more than six impedances and two current transformers in combination with polyphase instruments for segregating the effects of both the positive and the negative phase-sequence components of an electrical quantity of the circuit.

A further object of my invention is to provide an improved electrical instrument having a plurality of windings so related to the movable armature member as to actuate it when the windings are subjected to polyphase excitation. In the preferred form of the invention, the several windings are disposed in pairs angularly displaced in accordance with the number of phases in the circuit to which they are connected, and an induction-type armature is disposed in the field of the windings in such manner as to be actuated by the rotating field produced thereby.

In general, this invention deals with apparatus of the polyphase type rendered selectively responsive to symmetrical phase-sequence quantities and particularly to positive and negative phase-sequence components of currents. Means are provided for segregating the effects of such components rather than the components themselves. In the particular modification disclosed, such means include current transformers for obtaining currents from a circuit to be protected, a series of impedance devices for producing a system of currents which when combined in the polyphase-relay apparatus produce torques therein which are proportional to, or which vary as the positive and negative phase-sequence components of circuit currents. The relay apparatus is utilized to selectively control a circuit-interrupter in accordance with abnormal conditions in the circuit.

For a better understanding of my invention, reference may be had to the accompanying drawings, in which Fig. 1 is a diagrammatic view of an electrical system embodying my invention, and Fig. 2 is a detailed view showing the construction of the electrical instruments shown in Fig. 1.

Figure 1:
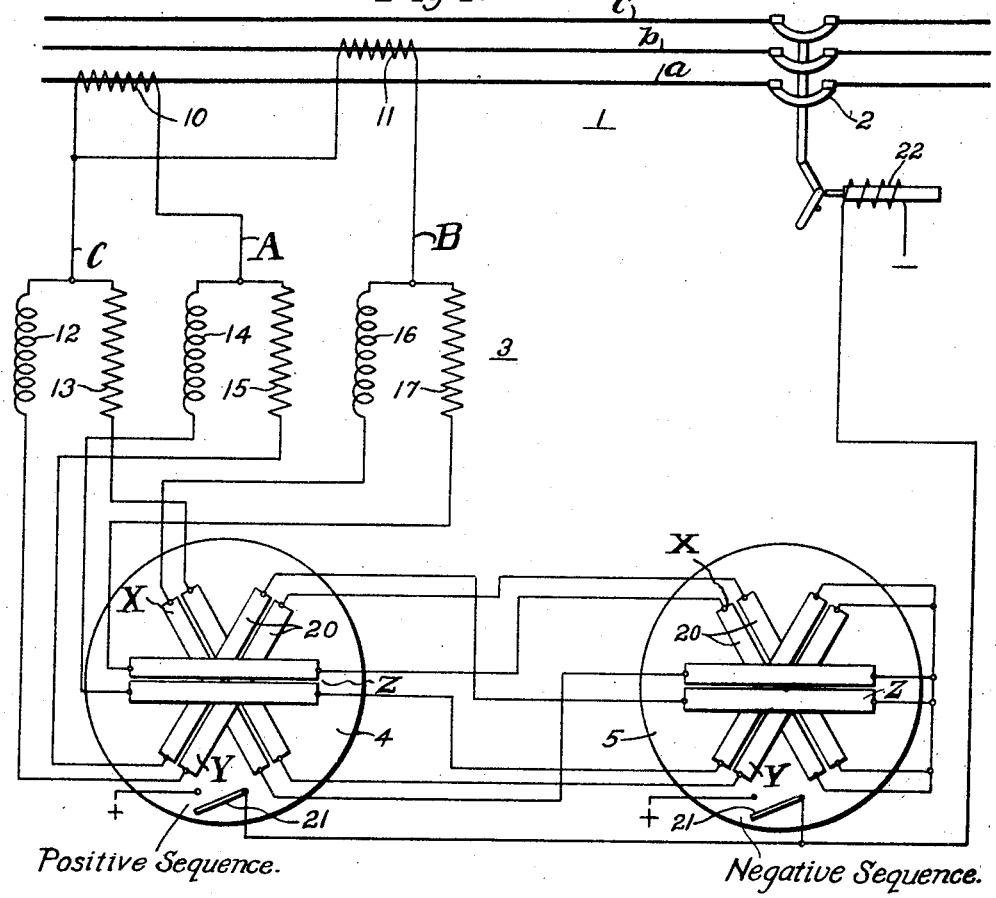

Referring to Fig. 1, an electrical system is shown comprising a three-phase circuit 1, a circuit-interrupter 2 disposed in said circuit, a stationary net-work 3 so connected to the circuit as to segregate the components of the currents in said circuit, and relays 4 and 5 connected to said net-work and arranged to trip the circuit-interrupter 2 when operatively energized.

Current transformers 10 and 11 are connected in separate phases as for example the phases $a$ and $b$ of the three-phase circuit 1. The stationary net-work 3 comprises three pairs of equal impedances 12 and 13, 14 and 15 and 16 and 17, one pair 12, 13 of impedances being connected to one terminal of each of the current transformers 10 and 11 and the other two pairs 14—15 and 16—17 of impedances being connected to both of the remaining terminals of the said current transformers.

The actual values of ohmic and for reactive impedance which the impedances and the windings will be designed to have, will depend, of course, upon the volt-ampere capacity of the current transformers to be used, or upon the burden to which their load must be limited. The capacity of the transformers will be governed by the type employed.

The individual impedances of each pair are of unlike phase characteristics, and the impedances have predetermined relative phase characteristics. In the case of a three-phase circuit, the phase characteristics of the circuits containing the impedances are so chosen that the currents through the individual elements of each pair are displaced in phase by 60 electrical degrees. The phase characteristics of the impedances depend, of course, upon the number of phases in the polyphase circuit to which they are connected because the currents and voltages in polyphase circuits having more or less than three phases have a different vectorial displacement. However, the pairs of impedances are exactly similar, as indicated.

The impedance of the several windings 20 of the relays 4 and 5 is the same. Similarly, the ohmic impedances of the impedance devices 12 to 17 inclusive, are equal. The reactance of the individual circuits of each pair of impedances must be designed to introduce an angular displacement of sixty electrical degrees between the currents traversing those circuits.

Assuming a phase rotation in circuit 1, in the sequence of lower conductor, middle conductor and upper conductor, the currents, and consequently, the fluxes in paired windings will normally be angularly displaced sixty electrical degrees in the relay 4. In the relay 5, however, the currents and the fluxes will be 180 electrical degrees out of phase and will balance out, normally.

A balanced three phase fault will actuate relay 4 but not relay 5. A single phase fault will cause an unbalanced current having a large negative sequence component and will actuate relay 5.

Each of the instruments 4 and 5 comprises six windings 20 connected to the respective impedances 12 to 17. With one direction of phase rotation in the circuit, the instrument 4, if its windings 20 are connected, as indicated to the impedances 12 to 17, will be actuated in accordance with the positive phase-sequence component of current in the circuit, and the instrument 5, if connected as indicated, will be actuated in accordance with the negative phase-sequence component of current in the circuit.

The instruments 4 and 5 may be provided with contact members 21 which may be so controlled as to be actuated upon the occurrence of an abnormal positive phase-sequence component of current or an abnormal negative phase-sequence component of current. In the specific application shown the contact members 21 are disposed to control a trip coil 22 of the circuit-interrupter 2 to open the circuit upon the occurrence of abnormal conditions.

Figure 2:
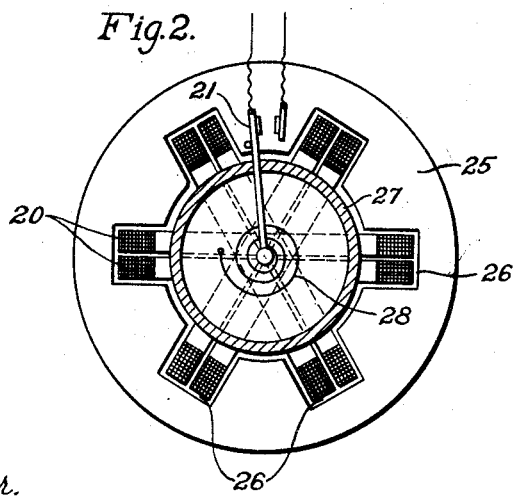

As shown in Fig. 2, the instrument, if constructed as a relay, comprises a magnetizable core member 25 having a plurality of slots 26 in which the several windings 20 are disposed. The armature member for controlling the contact member 21 may be constructed in the form of a pivoted, electrically-conducting drum or cylinder 27 controlled by any suitable restraining means, such as a retarding spring 28. In this form of instrument, the rotating field established by the windings 20 tends to turn the armature member 27 against the restraining force of the spring 28. When the rotating field becomes sufficiently strong, the armature member 27 overcomes the restraining force of the spring 28 and actuates the contact member 21 to the circuit-closing position.

In the three-phase modification shown, this invention, therefore, utilizes two identical polyphase relays 4 and 5, three identical impedance units 3 each including a resistance 13, 15, or 17 and an inductance 12, 14 or 16, and two current transformers 10, 11 connected in two of the phases of the three phase circuit, all for the purpose of actuating an associated circuit-interrupter 2 upon the occurrence of a fault condition relative to the protected circuit 1. The combination of the current transformers 10 and 11, the impedances 3 and the polyphase-responsive devices 4 and 5 all together constitute means for segregating the effects of the symmetrical phase-sequence components of current existing in the circuit 1 and for utilizing such components in controlling another device such as the circuit-interrupter 2. The impedances 3 produce a system of currents which, when combined in the responsive devices 4 and 5, in the manner herein disclosed, produce a torque which is proportional to the positive and negative phase-sequence components of currents in the protected circuit 1. By reason of their construction and connections, the relay 4 responds only to the positive-sequence component and the relay 5 only to the negative-sequence component and, consequently, the relay 4 may be utilized to respond to a balanced abnormal condition, such as a balanced three-phase fault or an overload condition, and the relay 5 may be utilized to respond to an unbalanced condition, such as a single-phase short-circuit relative to the wires $a$, $b$ of the circuit 1 for example.

Figure 3:
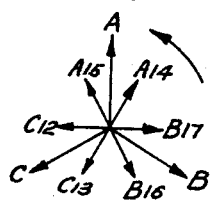
Figs. 3, 4 and 5 are diagrams representing vectorially the current and flux conditions in polyphase instruments when a balanced three-phase-circuit fault occurs.

A detailed description of the theory of the symmetrical phase-sequence components of current or other electrical quantities is not undertaken herein, inasmuch as these fundamental considerations are fully disclosed in the prior art and it will, therefore, be assumed that positive and negative-sequence components may be utilized to discriminate between normal and abnormal circuit conditions and between balanced and unbalanced abnormal conditions in a polyphase circuit. However a description of operation of the means utilized for responding to these quantities will be undertaken in connection with Figs. 3 to 8, inclusive, assuming first, a balanced three-phase fault condition and second, an unbalanced fault condition relative to the circuit 1. For this purpose, a series of vector diagrams are offered to explain in logical steps the proper combination of the currents in the windings 20 of the responsive devices 4 and 5 in order to make them operate with a torque proportional to the positive and negative phase sequence or symmetrical components. These will be explained as follows:

In Fig. 1, under balanced conditions, the impedances 12 to 17 inclusive in the three leads A, B, C split the three currents A, B, C associated therewith each into two parts, the current in each resistance part 13, 15, 17 leading its respective main current A, B, or C by 30°, and the current in each inductance part 12, 14, 16 lagging the main current A, B, or C by 30°. Thus, as shown in Figure 3:—

Figure 4:
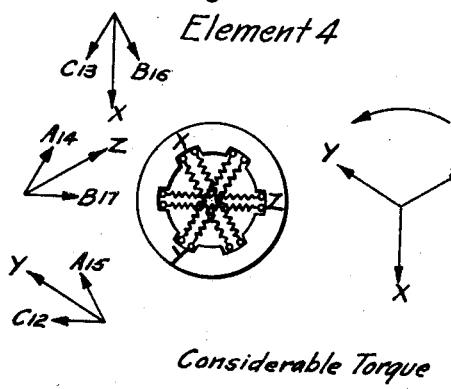

Currents $A_{14}-A_{15}$= current A
Currents $B_{16}-B_{17}$= current B
Currents $C_{12}-C_{13}$= current C The element 4 combines the components on the left-hand side of the above expressions in such a manner that under balanced conditions a three phase torque exists in the element 4 (Fig. 4). Thus in the pair of windings X the currents $B_{16}$ and $C_{13}$ flow, the fluxes thereof combining to produce flux "X". In the "Z" pair of windings the fluxes produced by currents $A_{14}$ and $B_{17}$ combine to produce a flux Z which leads flux X by 120°. In a similar manner currents $A_{15}$ and $C_{12}$ produce a flux Y leading the flux Z by 120°. Thus a three-phase flux is produced in element 4 by the proper combination of currents in the paired windings 20.

It should be noted that the currents in the impedances 12 to 17, inclusive, are not the symmetrical components but, when these currents are combined, as above-mentioned in the element 4, an instrument torque is obtained which is proportional to the positive sequence components.

The element 5 under balanced conditions combines the fluxes from the various currents in such a manner that zero torque is produced. Thus, current $B_{17}$ is paired with current $C_{12}$ and no flux results. Currents $A_{15}$ and $B_{16}$, and $A_{14}$ and $C_{13}$ are paired with like results. See Fig. 5. The element 5, therefore, produces no torque and, therefore, respresents the effect of the negative sequence components.

Figure 6:
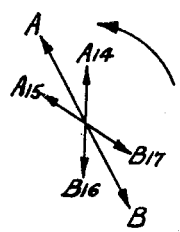
Figs. 6, 7 and 8 are diagrams similar to Figs. 3, 4 and 5 except representing the conditions when an unbalanced fault occurs.
Figure 7:
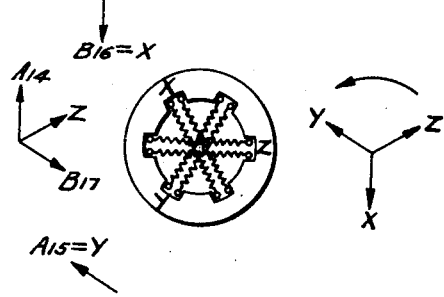
Figure 5:
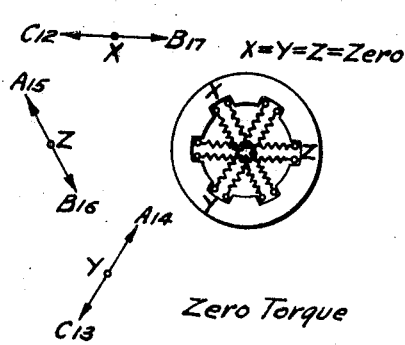
Figure 8:
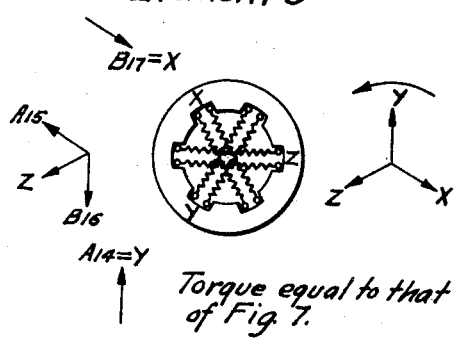

Figures 6, 7, 8 show the results when an unbalanced or a line-to-line fault or short-circuit occurs. In this particular case there is no current in lead C and Fig. 6 shows the relation of the other currents. In element 4, the "X" windings receive current $B_{16}$ only. The "Z" windings receive currents $A_{14}$ and $B_{17}$ whose fluxes add up to vector Z 120° leading the vector X. The vector Y for the "Y" pair of windings results from the single current $A_{15}$ flowing in one of the windings. In a similar manner Fig. 8 gives the conditions in the elements which is seen to have the opposite direction of torque corresponding to the negative sequence.

The system is, therefore, effective to respond to either a balanced or an unbalanced condition in accordance with the positive or negative phase-sequence components or both. In the modification illustrated, such components are utilized to isolate a fault condition of any type.

Special attention is called to the following features of this invention. This invention may utilize a polyphase element or instrument or device or relay as illustrated. Or stated differently the instrument is responsive to polyphase torque in accordance with the symmetrical phase sequence components. The symmetrical components are however not actually segregated as they are in devices heretofore used. In this invention, the sets of impedances 3, including the impedances 12 to 17 inclusive, do not in themselves constitute means for segregating the symmetrical components because the currents which appear therein are not proportional to the symmetrical components. The fluxes produced by the corresponding pairs of windings 20 or the windings X, Y and Z in the responsive devices 4 and 5 are however proportional to the symmetrical components and therefore it may be said that the impedances 3 in combination with the instruments 4 or 5 segregate the effects of the symmetrical components rather than the actual components themselves. The impedances 3 produce a system of currents which when combined in the manner shown produce an instrument torque which is proportional to the positive and negative phase sequence components. In other words, the effects of the components are segregated but not the components themselves. In its essence therefore, this invention may be said to consist of means including impedance devices and a polyphase torque device for segregating the effects of symmetrical phase sequence components and particularly the effects of the positive and negative phase sequences.

While I have illustrated my invention in connection with a relay or circuit-interrupter control system, as it has particular value in such systems, I do not consider that it is limited to such systems, as it may be employed, as indicated above, in connection with indicating or recording instruments and the like. Furthermore, I have shown only a form of my invention in which the instrument is responsive to a symmetrical component of current, but other modifications may be utilized by those skilled in the art.

Accordingly, I do not desire that my invention shall be limited in scope except as may be indicated in the appended claims.

I claim as my invention:

1. In combination with a polyphase circuit, means for segregating the effects of the symmetrical phase-sequence components of an electrical quantity of the circuit including two instruments having polyphase windings so connected as to be energized in accordance with the positive and negative phase-sequence components of the quantity, respectively.

2. In combination with a polyphase circuit, means for segregating the effects of the symmetrical components of currents traversing the circuit including two instruments having polyphase windings so connected as to be energized in accordance with the positive and negative phase-sequence components of the currents, respectively, under abnormal conditions.

3. In combination with a polyphase circuit, means for segregating the effects of the symmetrical phase-sequence components of an electrical quantity of the circuit under abnormal conditions, including impedances and two instruments, each instrument having a plurality of angularly displaced polyphase stationary windings so connected in series relation between said impedances as to be energized in accordance with the positive and negative phase-sequence of the quantity, respectively.

4. In combination with a polyphase circuit, means for segregating the effects of the symmetrical phase-sequence components of an electrical quantity of the circuit, under abnormal conditions, and polyphase instruments having a plurality of windings energized in accordance therewith, said windings being arranged in pairs, with an angular displacement between each pair of windings dependent upon the number of phases in the polyphase circuit.

5. In combination with a three-phase circuit, two current transformers in separate phases of the circuit, three pairs of equal impedances, one pair connected to a terminal of each transformer and the other pairs connected to both of the remaining terminals of the transformers, and an instrument having six windings connected to the said impedances, said windings being arranged in pairs angularly displaced from each other.

6. The combination with a circuit and a circuit-interrupter therefor, of interrupter control means including means energized from the circuit for producing a special system of electrical quantities and means adapted to utilize said quantities thereby producing a polyphase force varying as a symmetrical phase-sequence component of said circuit.

7. The combination with a circuit and a circuit-interrupter therefor, of interrupter control means embodying means including impedance devices energized from the circuit for producing a special system of electrical quantities and means including a polyphase instrument adapted to utilize said quantities thereby producing a force varying as a symmetrical phase-sequence component of said circuit.

8. The combination with a circuit and a circuit-interrupter therefor, of interrupter control means including current transformers and impedance devices energized from the circuit for producing a special system of currents and means including a plurality of polyphase relays adapted to utilize said currents whereby one relay produces a force varying as the positive phase-sequence component of circuit current and another relay produces a force varying as the negative phase-sequence component of circuit current.

9. The combination with a circuit, of means for selectively segregating the effects of the symmetrical phase-sequence components of said circuit said means including impedance devices and instruments subject to polyphase torques or forces.

10. In combination with an electrical circuit, apparatus including impedance means electrically associated therewith and means cooperating with said impedance means to effect a polyphase torque proportional to the phase-sequence components of an electrical quantity occurring in said circuit and characterized in that said apparatus segregates the effects of said components and not the components themselves.

11. In combination with an electric circuit, impedance means associated therewith, plural-winding means associated with said impedance means and cooperating therewith to effect a polyphase torque proportional to the phase-sequence components of an electrical quantity in said circuit and characterized in that only the effects of said components are segregated from said circuit.

In testimony whereof, I have hereunto subscribed my name this 16th day of July, 1926.

VLADIMIR GENKIN.